United States Patent [19]

Maldavs

[11] 4,444,223
[45] Apr. 24, 1984

[54] QUICK DISCONNECT COUPLING

[75] Inventor: Ojars Maldavs, Lincoln, Nebr.

[73] Assignee: Imperial Clevite Inc., Glenview, Ill.

[21] Appl. No.: 267,139

[22] Filed: May 26, 1981

[51] Int. Cl.³ .............................................. F16L 37/28
[52] U.S. Cl. ............................... 137/614.04; 285/277;
285/316
[58] Field of Search ....................... 137/614.01, 614.02,
137/614.03, 614.04, 614.05, 614.06; 251/149.6,
63; 285/316, 277

[56] References Cited

U.S. PATENT DOCUMENTS

| 3,039,794 | 6/1962 | Cenzo ................................... 285/316 |
| 3,260,275 | 7/1966 | Armstrong et al. .................. 251/63 |
| 3,358,708 | 12/1967 | Willioms ........................ 137/614.06 |
| 3,791,411 | 2/1974 | Bojeskov et al. ................. 251/149.6 |
| 4,221,235 | 9/1980 | Maldavs .......................... 137/614.04 |
| 4,240,466 | 12/1980 | Herzon et al. ................. 137/614.04 |

Primary Examiner—A. Michael Chambers
Attorney, Agent, or Firm—Russell E. Baumann

[57] ABSTRACT

A hydraulic quick disconnect coupling wherein the female half is free of external moving parts and a spring loaded internal fitting is employed to maintain the halves in either coupled or uncoupled condition.

1 Claim, 9 Drawing Figures

QUICK DISCONNECT COUPLING

BACKGROUND AND SUMMARY OF INVENTION

This invention relates to a quick disconnect coupling for hydraulic fluids and, more particularly, one which does not require external moving parts on the female half to enable connection.

Most quick disconnect couplings require external moving parts on the female half. Either the outside sleeve is retracted to permit connection and disconnection or the coupling is held by the outside sleeve and the body slides back and forth to permit connection and disconnection.

Through the provision of an interior moving part the coupling female half of this invention has no external moving parts and can be advantageously used in connection with a rigid mounting. For example, the female half can be rigidly mounted and plumbed with rigid hydraulic tubing. For operation, the male half is merely plugged in for connection and pulled out for disconnection. Further, the rigid housing construction permits the use of a variety of internal valving arrangements, thereby making the coupling suitable for a variety of applications and conditions.

According to the invention, a housing is provided as the exterior of the female half of the coupling. Mounted within the axial bore of the housing is a tubular fitting for connection with the exterior of the male half of the coupling. Additionally, the fitting carries the female half valve and means are interposed between the fitting and housing biasing the fitting to a predetermined position in both the uncoupled and coupled conditions. Other objects, advantages and details of the invention may be seen in the ensuing specification.

DETAILED DESCRIPTION

The invention is described in conjunction with the accompanying drawing, in which FIG. 1 is an elevational view, partially in section of the female half of the inventive coupling and with the male half similarly shown in the view designated FIG. 1A;

Figure 1:
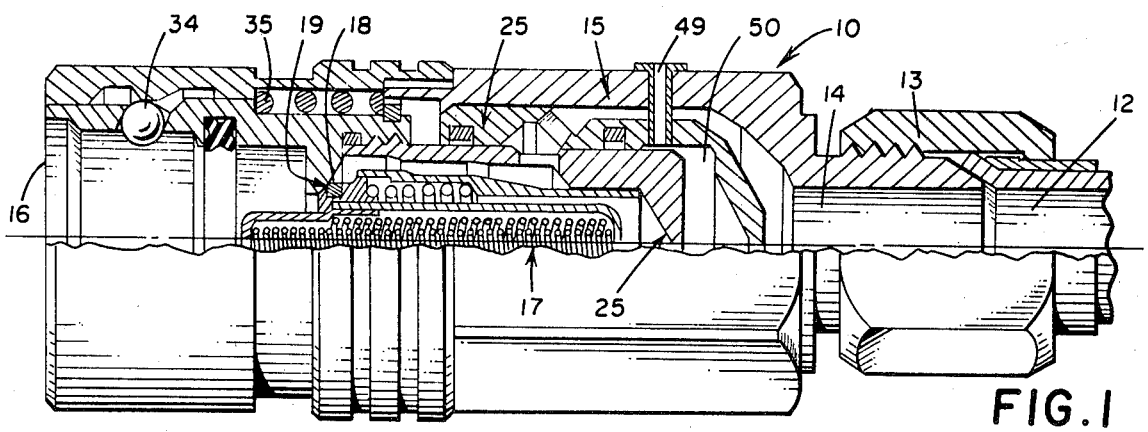
Figure 1A:
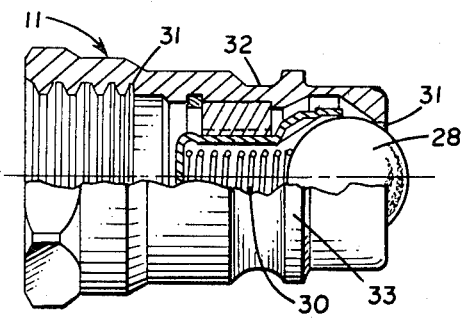

In the illustration given and with reference first to FIGS. 1 and 1A, the numeral 10 designates generally the female half of the coupling while the numeral 11 designates generally the male half. The two halves are shown in the process of being coupled in FIG. 2 and in the condition of full coupling in FIG. 3.

Referring to the extreme right hand end of FIG. 1, a hose 12 which may be rigid or flexible is seen to be attached via a threaded collar 13 to the nipple portion 14 of a housing generally designated 15.

The housing 15 is generally tubular in construction, being equipped with an axial bore and having an open end as at 16 for coupling to the male half 11. In the uncoupled condition as illustrated in FIG. 1, the female valve generally designated 17 is closed as can be appreciated from the fact that a seal 18 on the valve 17 is in engagement with a seat 19. In contrast to this, the seal 18 in FIG. 3 is seen to be spaced from the seat 19 so as to provide a through passage.

Figure 3:
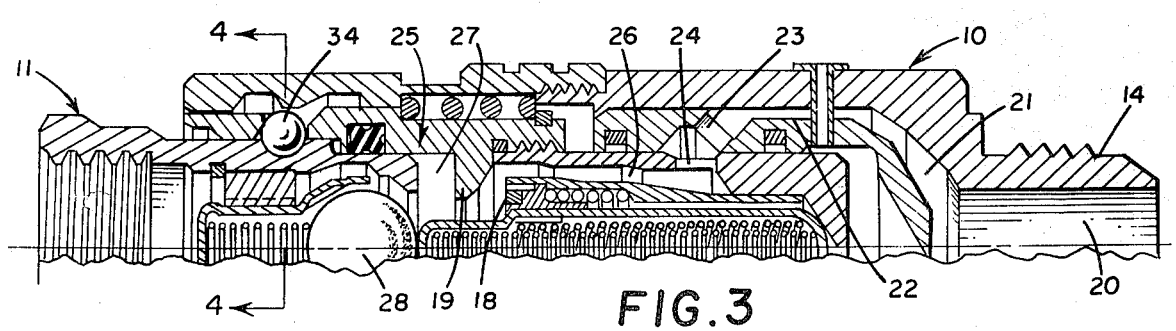
FIG. 3 is a view similar to FIG. 2 but showing the two halves completely coupled and with the valves thereof in open condition.

Still referring to FIG. 3, the through passage for hydraulic fluid flow includes the bore or passage 20 in the nipple portion 14—see the extreme right hand portion of FIG. 3. An annular flow passage as at 21 and 22 (still referring to FIG. 3) is provided by the housing and its interior parts. Fluid flow to the left is further accomplished by flowing through the ports 23 and 24—the latter being within a fitting generally designated 25. The valve 17 is slidably mounted within the fitting 25. The fitting 25 provides additional annular flow passage means as at 26 and 27 (still referring to FIG. 3). It will be appreciated that in FIG. 3, the ball valve 28 associated with the male half 11 is in the open condition, permitting flow in both directions.

In FIG. 1A, the male half 11 is seen to be equipped with the usual ball valve 29 which is urged by the spring 30 against a seat 31. The particular construction of the male half is not particularly germane to this invention. The male half 11 however, does have its own housing 31 for the valve and its associated parts and the exterior wall of the housing 31 is equipped with a circumferential depression 32. The depression means 32 is spaced from the valve end of the male half 11 thereby developing an abutment area 33 which extends circumferentially around the housing 31.

Operation

Figure 4:
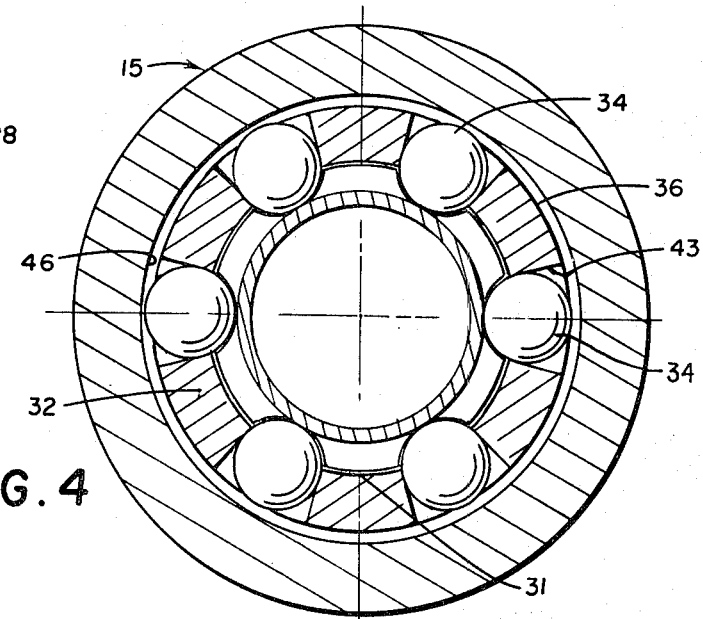
FIG. 4 is an enlarged sectional view such as would be seen along the sight line 4—4 of FIG. 3.
Figure 2:
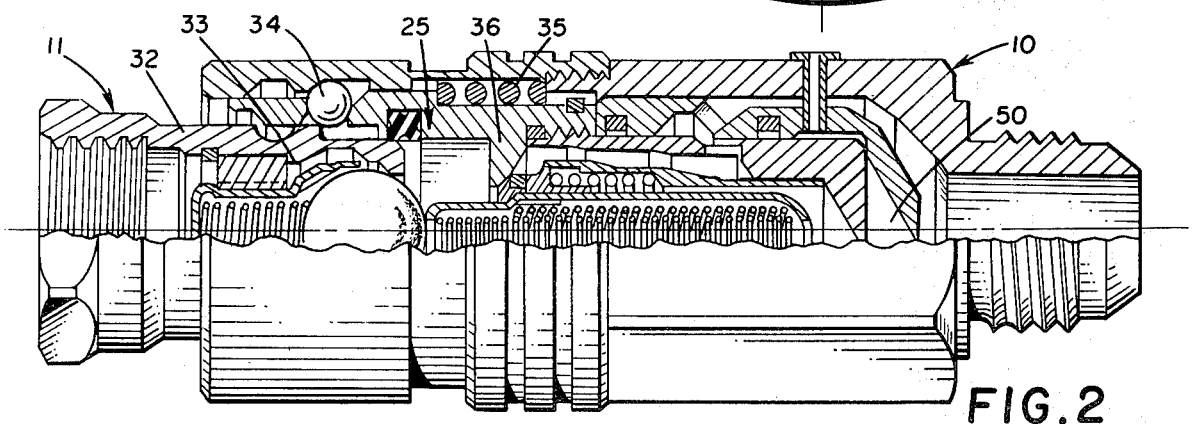
FIG. 2 is an elevational view partially in section of the male and female halves in the proceess of being coupled.

As the male element 11 is introduced into the female element 10—see FIG. 2, the abutment area 33 causes the locking balls 34 to move from their FIG. 1 condition to that illustrated in FIG. 2. The FIG. 1 and FIG. 3 condition of the balls 34 is also illustrated in FIG. 4. To achieve this translation of the balls 34, the fitting 25 must be moved from the FIG. 1 condition or position to that of FIG. 2. In so doing, a spring 35 interposed between the housing 15 and the fitting 25 is compressed, as illustrated in FIG. 2. When the depression means 32 becomes aligned with the balls 34, the balls are forced radially inwardly under the urging of the spring 35 to the condition illustrated in FIG. 3. The female and male halves 10 and 11, respectively, are now releasably locked in coupled condition. I prefer to construct the spring 35 of sufficiently heavy gauge wire so as to easily support the weight of any hydraulic hose attached to the male half 11 and thereby avoid inadvertent detachment.

Details of Fitting 25

Figure 5:
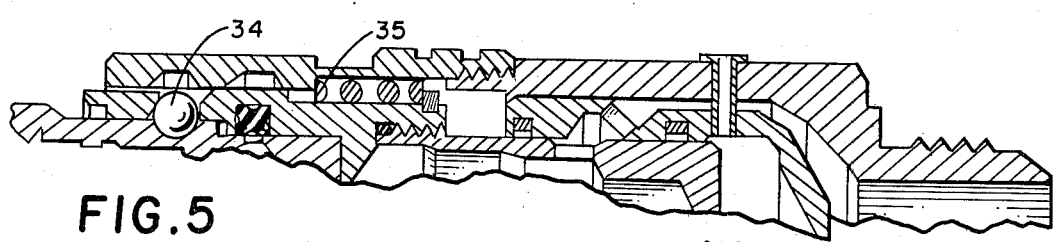
FIG. 5 is a fragmentary sectional view of the female half showing the arrangement of certain interior parts during the disconnect operation.

As indicated just above, movement of the fitting 25 is responsible for the coupling—and, as will be brought out hereinafter relative to FIG. 5, uncoupling of the male and female halves. In view of the fact that the same construction of fitting 25 is used throughout all of the views in the drawing, reference will now be made to FIG. 8 to describe the various portions of the fitting 25—this view being relatively free of reference numerals so as to facilitate understanding of the structure. The fitting 25 is constructed, in the illustration given, of two parts or elements 36 and 37. The element 37 is remote from the open end 16 and is threadably received as at 38 within the first element 36. The two elements 36 and 37 cooperate to provide an elongated tubular member closed at the end 39 remote from the open end 16. It is the element 37 which is equipped with the port 24 previously referred to in connection with fluid flow as illustrated in FIG. 3. The closed end 39 of the element 37 provides a bearing for the support of the female half valve 117—it will be noted that the valve 117 differs somewhat from the valve 17 thereby illustrating the versatility of the invention for accommodating different types of valves.

The element 37 is seen to be itself in bearing relation to a flow path defining member 29 which is fixedly mounted as at 40 to the interior of the housing 15. It is the member 29 which is equipped with the flow ports 23—see FIG. 3.

The left hand element 36 of the fitting 25 is seen to be in bearing relationship with the housing as at 41 and is the portion of the fitting equipped with circumferentially spaced apart openings 43 which receive and support the plurality of balls 34.

Figure 9:
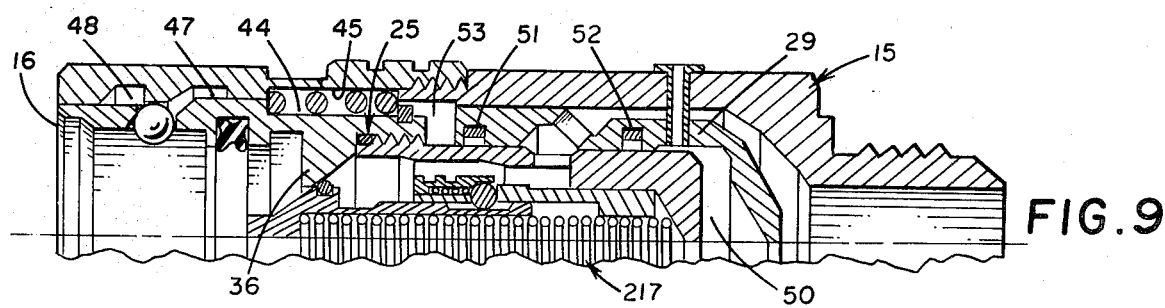

Referring now to FIG. 9 in order to avoid the complication of too many reference numerals, it will be seen that the fitting 25 and more particularly the element 36 at the end thereof remote from the open end 16 is equipped with an annular recess 44. The recess 44 is annular in nature and provided in the exterior wall of the element 36. Shown in confronting relation to the recess 44 is an inwardly facing recess 45 provided in the interior wall of the housing 15. It is within these confronting recesses 44 and 45 that the spring 35 is mounted.

Referring now to FIG. 2, it will be seen that the element 36 has been moved to the right fron its FIG. 1 condition and in so doing, the left hand portion of the fitting recess has compressed the spring 35 against the right hand portion of the housing recess. As indicated previously, this condition persists until the depression annulus 32 is aligned with the balls 34 permitting them to shift to the FIG. 3 condition whereupon the spring returns the two recesses 44 and 45 to their aligned condition as illustrated in FIGS. 3 and 6-9. More particularly, the cooperation of the recesses 44 and 45 and the spring 35 biases the fitting 25 to a predetermined position both when the female half is uncoupled FIGS. 1 and 7-9 and when it is coupled—see FIG. 3. In that predetermined position, the balls 34 are aligned with a landed area 46 (see FIG. 8) which is positioned between a pair of recesses 47 and 48 on opposite sides thereof—see FIG. 9. For uncoupling, the abutment portion 33 (see FIG. 1A) forces the ball 34 into the recess 48 closer to the open end 16—see FIG. 5—while again, the spring 35 is compressed. In this instance, however, the right hand end of the recess 44 operates to compress the spring against the left hand edge of the recess 45.

In the uncoupled condition, both valves are closed—see FIGS. 1 and 1A. This prevents hydraulic fluid from flowing out of the uncoupled halves. A vent tube or passage 49 (see the upper central portion of FIG. 1) is provided to allow the chamber 50 to remain at atmospheric pressure. This accommodates the movement of the fitting 25 during coupling—as when the closed end 39—see FIG. 2—moves to the right within the chamber 50. Thus, the vent passage 49 extends from the atmosphere through the housing 15 and the gland or flow passage defining member 29 to communicate with the chamber 50.

During coupling, as when the male half 11 is moved to the right and into the female half 10 as illustrated in FIG. 2, the shoulder on the abutment portion 33 contacts the balls 34. Further pushing on the male half 11 moves the fitting 25 to the right against the spring 35. This movement to the right aligns the balls 34 with the groove or recess 47 allowing the balls to retract therein and permitting the male half to fully insert into the female half. During this coupling operation, the valves 17 and 28 contact, forcing each other off of their respective valve seats.

When the two halves are completely coupled, the balls 34—see FIG. 3—lock the male half within the female half with both the valves 17 and 28 being open. Thus, fluid can pass in either direction.

Seals 51 and 52 (see FIG. 9) on the gland 29 balance the forces caused by hydraulic pressure by being located on both sides of the flow ports 23 and 24—see FIG. 3—and by sealing on identical diameters. Chambers or cavities 50 and 53—see the central portion of FIG. 9—are both at atmospheric pressure.

To disconnect, it is merely necessary to pull on the male half hose. The pull force will move the fitting 25 to the left against the spring 35. When the balls 34 align with the groove or recess 48, the balls retract therein, allowing the male half to release. As the two halves disconnect, the valves close simultaneously.

Figure 7:
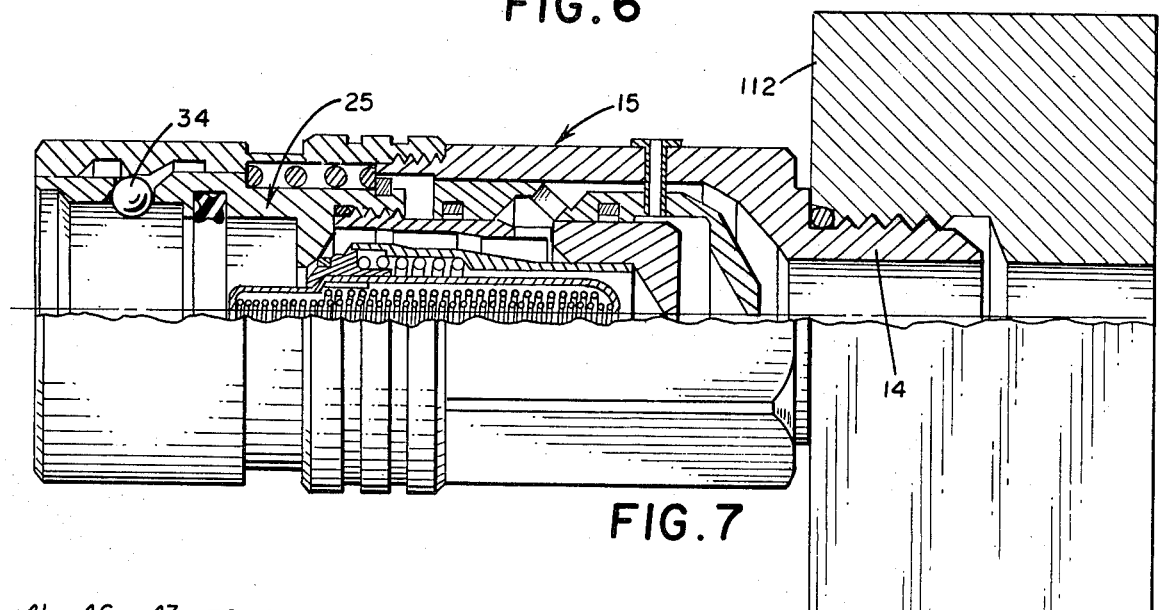
FIG. 7 is an elevational view partially in section of the invention shown in connection with a rigid housing.

In FIG. 7, the housing 15 is seen to be installed directly on a rigid housing 112 without the need of any plumbing.

Figure 6:
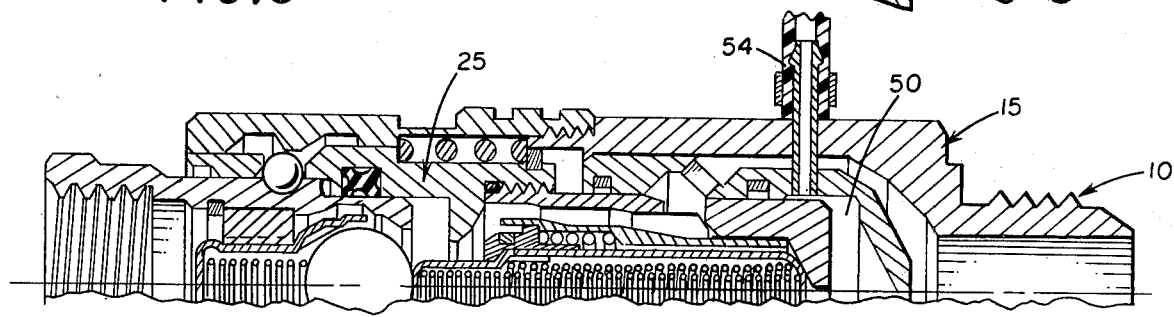
FIG. 6 is a view similar to FIG. 3 but showing the coupling arranged for remote disconnect operation.

Referring now to FIG. 6, by the attachment of a pressurizing means 54 to the cavity 50, the coupling can be disconnected from a remote location. Pressurizing cavity 50 through the means 54 will shift the fitting 25 to the left, allowing the male half to eject from the female half.

The instant invention provides a number of advantages or features among which are ease in connection and disconnection as in not having to manually retract an external sleeve. The coupling does not require plumbing with hoses to permit body movement—the fitting can be plumbed with rigid tubing which costs less, lasts longer and has fewer oil leaks. More particularly, the female half can be mounted directly into a valve housing or machine and eliminate plumbing completely.

Figure 8:
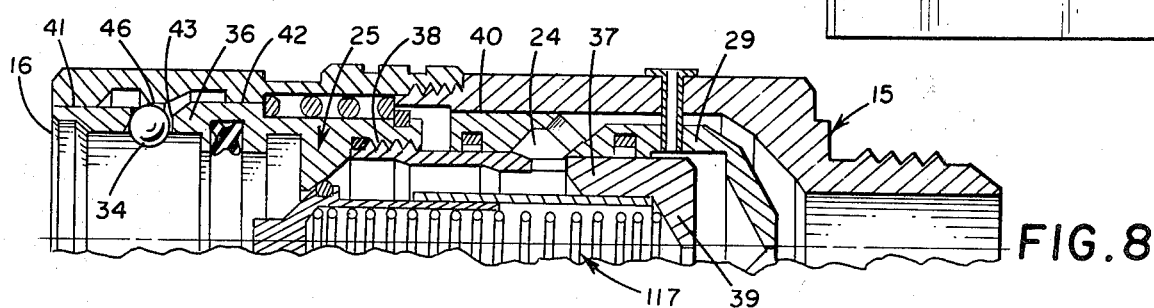
FIGS. 8 and 9 fragmentary sectional views of the female half of the coupling illustrated with different interior valve constructions.

Even further, the instant invention makes possible a variety of internal valving designs as can be appreciated from a comparison of the valve 17 of FIG. 1, the valve 117 of FIG. 8 and the valve 217 of FIG. 9.

By remote pressurization to the pressure vent 49, the coupling will automatically disconnect. Two hoses can be simply disconnected by merely pulling without a lanyard or break-away mounting and the function of the coupling is not affected by hose forces.

While in the foregoing specification a detailed description of the invention has been set down for the purpose of illustration, many variations in the details given may be made by those skilled in the art without departing from the spirit and scope of the invention.

I claim:

1. A hydraulic quick disconnect coupling for the female half of a male-female connection for a flow stream comprising a flow means terminating in a rigid tubular housing having an open end, a fitting slidably mounted in said housing and having a bore sized to receive the male half of said connection when the same is inserted into said open end, a flow path-defining member fixedly mounted in the bore of said housing remote from said open end, said member also being equipped with an axial bore slidably supporting a portion of said fitting and closed at the end thereof remote from said housing open end, said housing and member being equipped with passage means to vent the space between said fitting closed end and said member closed end and in which a pressure means can be coupled to said passage means to provide for remote control of disconnection, a spring outside of said flow stream interposed between said housing and fitting urging said fitting toward a predetermined position, said fitting adjacent said open end being equipped with a plurality of radially extending, circumferentially spaced openings, a ball in each opening for coaction with depression means in said male half to maintain said connection when said fitting is in said predetermined position, said housing adjacent said open end being equipped with a pair of circumferentially extending, axially spaced recesses for selectively receiving said balls, a landed area between said recesses for coaction with said balls when said fitting is in said predetermined position, said fitting being closed at the end thereof remote from said open end and having a single piece portion with two seals contained therein and an internal sliding member made of a single piece, a valve slidably mounted in said fitting, and a flow port in said outer housing intermediate the ends thereof.

* * * * *